(No Model.)
F. H. DISBROW.
STONING KNIFE.
No. 469,550. Patented Feb. 23, 1892.
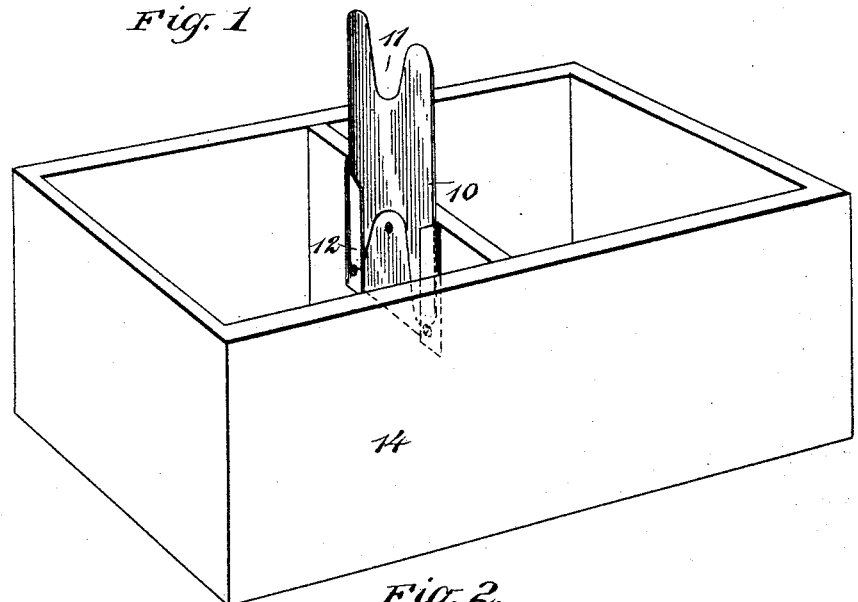
Fig. 1.
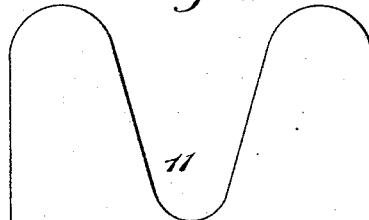
Fig. 2.
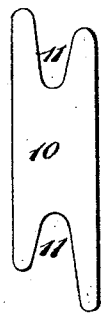
Fig. 4.
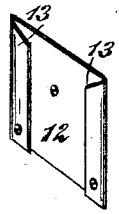
Fig. 3.
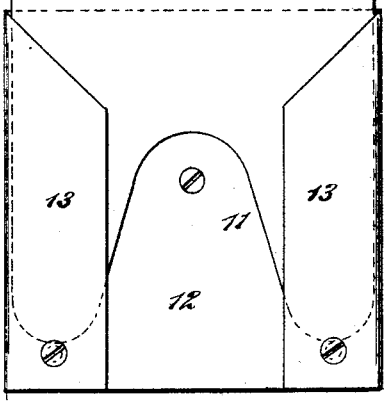
WITNESSES:
J. O. Criswell
C. Sedgwick
INVENTOR:
F. H. Disbrow
BY Munn & Co.
ATTORNEYS

UNITED STATES PATENT OFFICE.

FRANK H. DISBROW, OF GLENDORA, CALIFORNIA.

STONING-KNIFE.

SPECIFICATION forming part of Letters Patent No. 469,550, dated February 23, 1892.

Application filed June 27, 1891. Serial No. 397,705. (No model.)

*To all whom it may concern:*

Be it known that I, FRANK H. DISBROW, of Glendora, in the county of Los Angeles and State of California, have invented a new and Improved Stoning-Knife, of which the following is a full, clear, and exact description.

My invention relates to improvements in knives which are adapted to remove stones from fruit, and especially from apricots; and the object of my invention is to produce a simple, convenient, and efficient knife by means of which the stones or pits may be rapidly removed from the apricots and which may be quickly reversed, so as to fit different sizes of fruit.

To this end my invention consists in certain features of construction and combinations of parts, which will be hereinafter described and claimed.

Reference is to be had to the accompanying drawings, forming a part of this specification, in which similar figures of reference indicate corresponding parts in all the views.

Figure 1 is a perspective view of the knife and holder, showing them applied to a form of box with which they are preferably used. Fig. 2 is an enlarged front view of the knife and holder detached from the box. Fig. 3 is a detail perspective view of the holder, and Fig. 4 is a detail perspective view of the knife.

The knife 10 is made of a sheet of flat thin metal and is provided at each end with a rounding notch 11, the notches being of different sizes, so as to fit different sizes of fruit, and the ends of the knives are ground to edges, so as to easily cut the fruit. The knife is held in the holder 12, which is preferably formed of sheet metal and has its side edges 13 doubled over, so that the knife may be slid between the doubled portions and the body of the holder. This holder and knife are preferably used in connection with a box 14, which is divided by a central vertical partition, as shown in Fig. 1, and the holder is secured to the partition.

The knife is inserted in the holder, as described, and the upper edge of the knife will thus come well above the box. The apricots to be stoned or pitted are placed one by one in the upper notch 11 of the knife, and the apricots are turned back and forth, so that the fruit will be cut entirely around, and the fruit is then pushed downward from the knife, thus leaving the stone in the notch 11, from which it drops into one of the compartments of the box 14. It will be seen that if the fruit does not fit well in one notch the knife may be quickly reversed, so as to bring the other notch in position.

When this form of knife is used, it is not held in the hand, and the operator has both hands to use. Consequently he can work very fast, and while the knife and holder are preferably secured in a box, as described, they may be attached to any suitable support.

Having thus described my invention, I claim as new and desire to secure by Letters Patent—

1. A stoning-knife formed of thin metal and having a notch in each end, substantially as described.

2. A stoning-knife having its opposite ends sharpened and provided with rounding notches, substantially as described.

3. The combination, with a flat reversible knife of the character described, of a holder having side slideways to receive the knife, substantially as described.

4. The combination, with a reversible knife of the character described, of a holder formed of sheet metal with its side edges doubled over to form slideways, said holder being adapted for attachment to a support, substantially as described.

FRANK H. DISBROW.

Witnesses:
JOHN E. DALY,
JACOB L. SNARELY.